(12) United States Patent
Kushwaha et al.

(10) Patent No.: US 10,298,606 B2
(45) Date of Patent: May 21, 2019

(54) APPARATUS, SYSTEM, AND METHOD FOR ACCELERATING SECURITY INSPECTIONS USING INLINE PATTERN MATCHING

(71) Applicant: Juniper Networks, Inc., Sunnyvale, CA (US)

(72) Inventors: Deepak Kushwaha, Bangalore (IN); Mohit Joshi, Bangalore (IN); Puneet Tutliani, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 133 days.

(21) Appl. No.: 15/400,922

(22) Filed: Jan. 6, 2017

(65) Prior Publication Data
US 2018/0198809 A1   Jul. 12, 2018

(51) Int. Cl.
*G06F 21/56* (2013.01)
*H04L 29/06* (2006.01)

(52) U.S. Cl.
CPC ........ *H04L 63/1425* (2013.01); *G06F 21/564* (2013.01); *H04L 63/0227* (2013.01); *H04L 63/145* (2013.01); *H04L 63/1416* (2013.01)

(58) Field of Classification Search
CPC ............. H04L 63/1425; H04L 63/1416; H04L 63/0227; H04L 63/145; G06F 21/564
See application file for complete search history.

(56) References Cited

U.S. PATENT DOCUMENTS

| | | | |
|---|---|---|---|
| 9,276,851 B1* | 3/2016 | Dror | H04L 45/745 |
| 9,736,251 B1* | 8/2017 | Samant | H04L 43/00 |
| 2006/0191008 A1* | 8/2006 | Fernando | G06F 21/554 |
| | | | 726/23 |
| 2008/0189784 A1* | 8/2008 | Mangione-Smith | G06F 21/566 |
| | | | 726/23 |
| 2008/0201772 A1* | 8/2008 | Mondaeev | H04L 63/1408 |
| | | | 726/13 |
| 2009/0016226 A1* | 1/2009 | LaVigne | H04L 63/1408 |
| | | | 370/241 |
| 2009/0235355 A1* | 9/2009 | Chen | H04L 63/0209 |
| | | | 726/23 |
| 2009/0241190 A1* | 9/2009 | Todd | G06F 21/53 |
| | | | 726/23 |
| 2011/0314547 A1* | 12/2011 | Yoo | G06F 21/55 |
| | | | 726/24 |

(Continued)

*Primary Examiner* — Michael Pyzocha
(74) *Attorney, Agent, or Firm* — FisherBroyles, LLP

(57) ABSTRACT

The disclosed apparatus may include a physical processing that (1) receives, at a network device, a packet that is destined for a computing device within a network, (2) performs pattern matching on the packet by (A) comparing at least a portion of the packet with a set of signatures that facilitate pattern matching in connection with network traffic and (B) determining, based at least in part on the comparison, that the portion of the packet matches at least one of the signatures, (3) parses, after performing the pattern matching, at least the portion of the packet to determine whether the packet is malicious based at least in part on the portion of the packet, and then (4) upon determining that the portion of the packet is malicious, performs at least one security action in connection with the packet. Various other apparatuses, systems, and methods are also disclosed.

18 Claims, 6 Drawing Sheets

(56) References Cited

U.S. PATENT DOCUMENTS

| | | | |
|---|---|---|---|
| 2013/0019042 A1* | 1/2013 | Ertugay | G06F 13/385 |
| | | | 710/267 |
| 2014/0223564 A1* | 8/2014 | Joo | H04L 63/1416 |
| | | | 726/23 |
| 2015/0055481 A1 | 2/2015 | Guo et al. | |
| 2015/0326534 A1* | 11/2015 | Guo | H04L 45/121 |
| | | | 726/13 |
| 2016/0321289 A1* | 11/2016 | Zak | G06F 17/30153 |
| 2016/0330301 A1* | 11/2016 | Raindel | H04L 67/327 |
| 2017/0099310 A1* | 4/2017 | Di Pietro | H04L 63/1425 |
| 2017/0187735 A1* | 6/2017 | Zheng | H04L 63/1416 |

\* cited by examiner

APPARATUS, SYSTEM, AND METHOD FOR ACCELERATING SECURITY INSPECTIONS USING INLINE PATTERN MATCHING

BACKGROUND

Security inspections performed on network communications often consume a significant amount of resources. For example, a firewall may perform security inspections on packets entering a network. As part of such inspections, the firewall may first parse the packets and then attempt to match certain information parsed from the packets with signatures included in an Intrusion Prevention System (IPS) database. In this example, the firewall may perform the parsing and the matching with a Central Processing Unit (CPU) and/or a Graphics Processing Unit (GPU). In the event that information parsed from one of the packets matches a signature that represents a known attack pattern, the firewall may classify the packet as malicious and then take some sort of remedial action.

Unfortunately, since traditional IPS parsing and matching operations are performed by the CPU and/or GPU, these operations may slow down the CPU and/or GPU relative to the packet Input/Output (I/O) rate and/or line rate, thereby impairing the firewall's performance. Moreover, since traditional IPS security inspections call for packets to be parsed before being matched, the firewall may end up parsing packets that ultimately result in no match, thereby decreasing the efficiency of the IPS security inspections.

The instant disclosure, therefore, identifies and addresses a need for systems and methods for accelerating security inspections using inline pattern matching.

SUMMARY

As will be described in greater detail below, the instant disclosure generally relates to apparatuses, systems, and methods for accelerating security inspections using inline pattern matching. In one example, an apparatus for accomplishing such a task may include (1) at least one storage device that stores a set of signatures that facilitate pattern matching in connection with network traffic and (2) at least one physical processing device communicatively coupled to the storage device, wherein the physical processing device (A) receives, at a network device, a packet that is destined for a computing device within a network, (B) performs pattern matching on the packet by (I) comparing at least a portion of the packet with the set of signatures stored in the storage device and (II) determining, based at least in part on the comparison, that the portion of the packet matches at least one of the signatures, (C) parses, after performing the pattern matching, at least the portion of the packet to determine whether the packet is malicious based at least in part on the portion of the packet, and then (D) upon determining that the packet is malicious, performing at least one security action in connection with the packet.

Similarly, a system incorporating the above-described apparatus may include (1) at least one storage device that stores a set of signatures that facilitate pattern matching in connection with network traffic and (2) at least one physical processing device communicatively coupled to the storage device, wherein the physical processing device (A) receives, at the firewall device, a packet that is destined for a computing device within a network, (B) performs pattern matching on the packet by (I) comparing at least a portion of the packet with the set of signatures stored in the storage device and (II) determining, based at least in part on the comparison, that the portion of the packet matches at least one of the signatures, (C) parses, after performing the pattern matching, at least the portion of the packet to determine whether the packet is malicious based at least in part on the portion of the packet, and then (D) upon determining that the packet is malicious, performing at least one security action in connection with the packet.

A corresponding method may include (1) receiving, at a network device, a packet that is destined for a computing device within a network, (2) performing pattern matching on the packet by (A) comparing at least a portion of the packet with a set of signatures that facilitate pattern matching in connection with network traffic and (B) determining, based at least in part on the comparison, that the portion of the packet matches at least one of the signatures, (3) parses, after performing the pattern matching, at least the portion of the packet to determine whether the packet is malicious based at least in part on the portion of the packet, and then (4) upon determining that the packet is malicious, performing at least one security action in connection with the packet.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
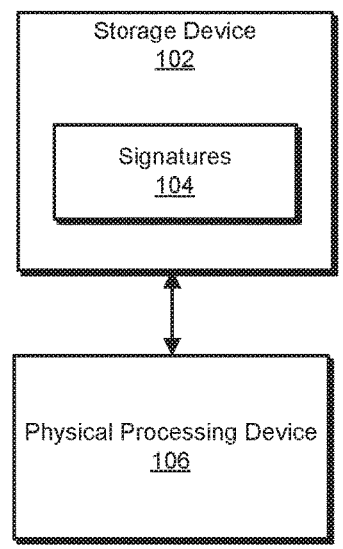
FIG. 1 is a block diagram of an exemplary apparatus for accelerating security inspections using inline pattern matching.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for accelerating security inspections using inline pattern matching. As will be explained in greater detail below, embodiments of the instant disclosure may perform pattern matching on packets before parsing the same. As a result, these embodiments may increase the efficiency of security inspections (such as deep packet inspections) by parsing only those packets whose contents resulted in a pattern match. In other words, these embodiments may enable network devices to achieve selective and/or intelligent parsing during security inspections.

Additionally or alternatively, embodiments of the instant disclosure may offload the pattern matching operations to hardware engines (such as a line card and/or an Application Specific Integrated Circuit (ASIC)). In doing so, these embodiments may free up and/or make available CPU and/or GPU resources that would have otherwise been consumed by the pattern matching operations. As a result, these embodiments may enable hardware engines to perform pattern matching on incoming packets and then forward only those packets whose contents resulted in a pattern match to the CPU and/or GPU for parsing, thereby eliminating a significant amount of processing overhead and speeding up security inspections as a whole.

Figure 2:
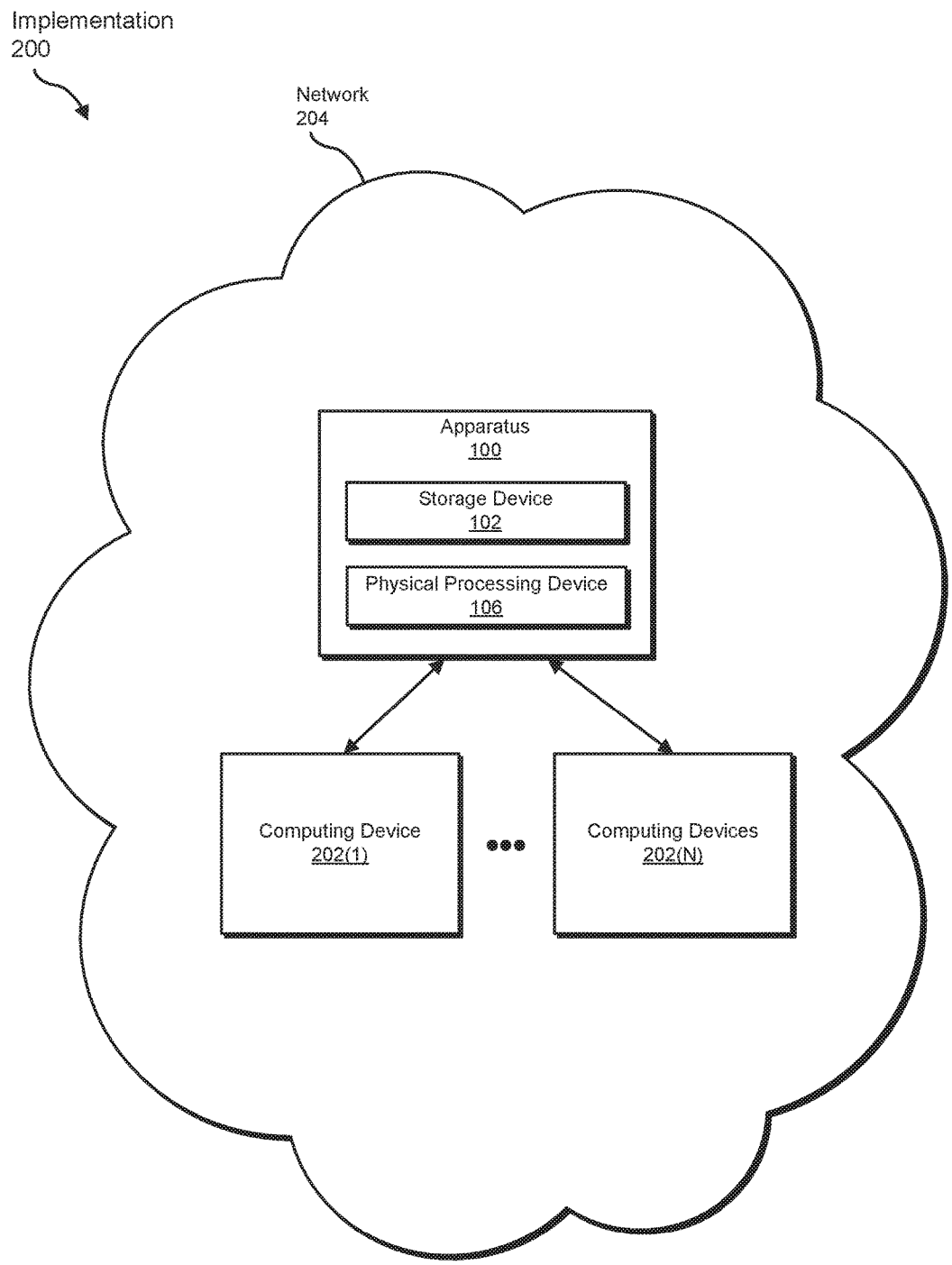
FIG. 2 is a block diagram of an exemplary implementation of an apparatus for accelerating security inspections using inline pattern matching.

The following will provide, with reference to FIGS. 1 and 2, examples of apparatuses and/or corresponding implementations for accelerating security inspections using inline pattern matching. Detailed descriptions of an exemplary HTTP request and an exemplary set of signatures that facilitate pattern matching will be provided in connection with FIGS. 3 and 4, respectively. Detailed descriptions of an exemplary method for accelerating security inspections using inline pattern matching will be provided in connection with FIG. 5. Finally, the discussion corresponding to FIG. 6 will provide numerous examples of systems that may include the apparatuses and/or components shown in FIGS. 1 and 2.

FIG. 1 is a block diagram of an exemplary apparatus 100 for accelerating security inspections using inline pattern matching. In one example, apparatus 100 may include and/or represent a physical firewall device. Additional examples of apparatus 100 include, without limitation, network devices, routers, switches, hubs, modems, bridges, repeaters, gateways, load balancers, multiplexers, network adapters, servers, client devices, portions of one or more of the same, variations or combinations of one or more of the same, and/or any other suitable apparatus.

As illustrated in FIG. 1, apparatus 100 may include one or more storage devices, such as storage device 102. Storage device 102 generally represents any type or form of volatile or non-volatile memory or medium capable of storing data and/or computer-readable instructions. In one example, storage device 102 may include a database that stores, loads, and/or maintains a set of signatures 104 that facilitate pattern matching in connection with network traffic. Examples of storage device 102 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage device.

Signatures 104 each generally represent any type or form of representation, hash, pattern, and/or data capable of being used as a reference for pattern matching. In some examples, signatures 104 may be applied to the contents (such as the header and/or the body) of an incoming packet to determine whether any portion of the packet includes and/or represents a certain data pattern. Some of signatures 104 may include and/or represent malicious patterns whose presence in a packet indicates and/or suggests that the packet is part of an attack. Additionally or alternatively, some of signatures 104 may include and/or represent patterns whose presence in a packet does not necessarily indicate and/or suggest that the packet is part of an attack.

In some examples, signatures 104 may correspond to a certain location or portion of a packet. For example, one of signatures 104 may indicate that a packet is malicious only if a corresponding data pattern is found in the header of the packet. Additionally or alternatively, another one of signatures 104 may indicate that a packet is malicious only if a corresponding data pattern is found in the body of the packet.

As illustrated in FIG. 1, apparatus 100 may also include one or more physical processing devices, such as physical processing device 106. Physical processing device 106 generally represents any type or form of hardware-implemented computing device capable of interpreting and/or executing computer-readable instructions. In one example, physical processing device 106 may access and/or modify one or more of signatures 104 stored in storage device 102. Additionally or alternatively, physical processing device 106 may enable apparatus 100 to facilitate accelerating security inspections using inline pattern matching. Examples of physical processing device 106 include, without limitation, microprocessors, microcontrollers, CPUs, GPUs, Field-Programmable Gate Arrays (FPGAs) that implement softcore processors, Application-Specific Integrated Circuits (ASICs), portions of one or more of the same, variations or combinations of one or more of the same, and/or any other suitable physical processing device.

Exemplary apparatus 100 in FIG. 1 may be implemented in a variety of ways. For example, all or a portion of exemplary apparatus 100 may represent portions of exemplary implementation 200 in FIG. 2. As shown in FIG. 2, implementation 200 may include computing devices 202(1)-(N) in communication with apparatus 100 within a network 204. As will be described in greater detail below, apparatus 100 may accelerate security inspections performed on packets destined for computing devices 202(1)-(N) by using inline pattern matching.

Computing devices 202(1)-(N) generally represents any type or form of computing device capable of reading computer-executable instructions. In one example, computing devices 202(1)-(N) may include and/or represent client devices and/or end-user devices. Additional examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices.

Network 204 generally represents any medium or architecture capable of facilitating communication or data transfer. In one example, network 204 may include computing devices 202(1)-(N) and apparatus 100 and/or facilitate communication between computing devices 202(1)-(N) and apparatus 100. In this example, network 204 may facilitate communication or data transfer using wireless and/or wired connections. Examples of network 204 include, without limitation, an intranet, a Wide Area Network (WAN), a Local Area Network (LAN), an enterprise network, a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some examples, physical processing device 106 of apparatus 100 may receive a packet that is destined for computing device 202(1) within network 204. For example, a computer (not necessarily illustrated in FIG. 2) may attempt to send a packet to computing device 202(1) by way of apparatus 100. In this example, the packet may arrive at apparatus 100 via an ingress port and/or line card.

The term "packet," as used herein, generally refers to any type or form of communication and/or message that is sent and/or received by a computing device. In one example, a packet may include and/or represent an HTTP message. Additionally or alternatively, a packet may include and/or represent an Internet Protocol (IP) packet (such as an IPv4 packet and/or an IPv6 packet).

As the packet arrives at apparatus 100, physical processing device 106 may perform pattern matching on the packet. For example, physical processing device 106 may compare all or portions of the packet with the set of signatures 104 stored in storage device 102. In one example, physical processing device 106 may determine that at least one portion of the packet matches a known malicious signature from signatures 104. In the event of a pattern match, physical processing device 106 may parse the packet to determine and/or confirm whether that portion or any other portion of the packet indicates and/or suggests that the packet is malicious.

As an example, physical processing device 106 may check whether the matched portion of the packet is located in a position where that portion is indicative and/or suggestive of a malicious attack. In other words, physical processing device 106 may derive the context of the matched portion of the packet by way of parsing and then determine whether the packet is malicious based at least in part on that context. For example, physical processing device 106 may detect a certain pattern match in the header of a packet. In this example, that particular pattern may indicate and/or suggest that the packet is malicious if the pattern is located in the header of the packet. However, that same pattern may not necessarily indicate and/or suggest that the packet is malicious if the pattern were located in the body of the packet.

In another example, physical processing device 106 may determine that no portion of the packet matches any of signatures 104. As a result, physical processing device 106 may refuse to parse and/or forego parsing the packet since none of the packet matched any of signatures 104. By doing so, physical processing device 106 may eliminate a significant amount of processing overhead and/or speed up security inspections at apparatus 100 as a whole. Accordingly, physical processing device 106 may increase the efficiency of security inspections at apparatus 100 by parsing only those packets whose contents resulted in a pattern match. In other words, for a security inspection to result in a malicious classification in this example, physical processing device 106 may need to (1) detect a pattern match within a packet, (2) parse the packet to identify the context of the pattern match, and then (3) determine that the context of the pattern match is known to be malicious.

In some examples, the pattern-matching phase and the parsing phase may be performed by different components and/or devices within apparatus 100. For example, part of physical processing device 106 may include and/or represent a line card or an ASIC that performs the pattern matching on packets that arrive at apparatus 100. In this example, another part of physical processing device 106 may include and/or represent a CPU or a GPU that parses the contents of the matched packets to identify the context of the pattern matches. Accordingly, upon completing the pattern matching, the line card or ASIC may forward the packet to the CPU or GPU to perform the parsing.

In another example, the pattern-matching phase and the parsing phase may be performed by the same component and/or device within apparatus 100. For example, physical processing device 106 may include and/or represent a CPU or a GPU that performs the pattern matching on packets that arrive at apparatus 100. Upon completing the pattern matching, the CPU or GPU may then parse the contents of the matched packets to identify the context of the pattern matches.

Figure 3:
FIG. 3 is an illustration of an exemplary HyperText Transfer Protocol (HTTP) request.

As a specific example, an HTTP request 300 in FIG. 3 may arrive at apparatus 100 by way of an ingress port on a line card. As illustrated in FIG. 3, HTTP request 300 may include and/or identify a request line (in this example, "GET/index.html HTTP/1.1"), a header (in this example, "Host: www.suspiciouswebsite.com," "User-Agent: Mozilla/5.0 (compatible; MSIE 7.0; Windows NT 6.1; Trident/4.0; SLCC2; .NET CLR 2.0.50727; .NET CLR 3.5.30729; .NET CLR 3.0.30729; Media Center PC 6.0; InfoPath.3; SuspiciousAgent 5.0)," "Accept: text/xml, text/html, text/plain, image/jpeg," "Accept-Language: en-us, en," "Accept-Encoding: gzip," "Keep-Alive: 300," and "Connection: keep-alive") and a body (in this example, the body is empty).

Figure 4:
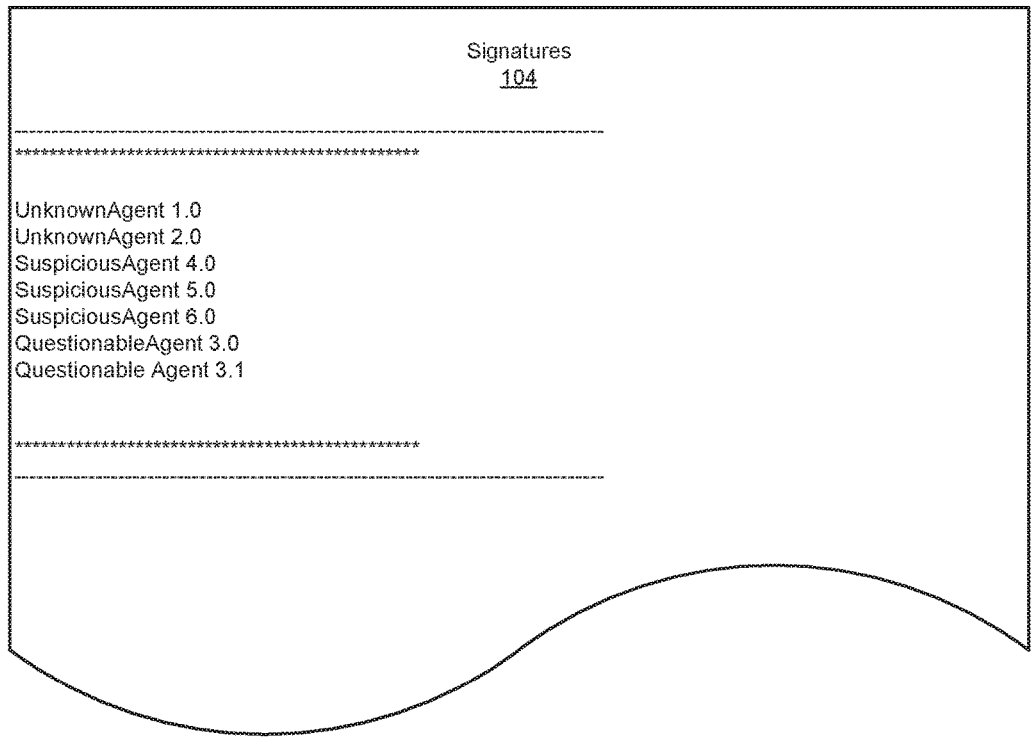
FIG. 4 is an illustration of an exemplary set of signatures that facilitate pattern matching in connection with network traffic.

In this example, the line card may receive HTTP request 300 and then perform the pattern matching on the same. For example, the line card may compare the contents of HTTP request 300 against the set of signatures 104 in FIG. 4. As illustrated in FIG. 4, the set of signatures 104 may include and/or represent certain patterns that, in some contexts, are indicative and/or suggestive of a malicious packet (in this example, "UnknownAgent 1.0," "UnknownAgent 2.0," "SuspiciousAgent 4.0," "SuspiciousAgent 5.0," "SuspiciousAgent 6.0," "QuestionableAgent 3.0," and "QuestionableAgent 3.1"). In this example, the line card may determine that the "SuspiciousAgent 5.0" signature from the set of signatures 104 is included and/or found in HTTP request 300.

Continuing with this example, since a portion of HTTP request 300 matched the "SuspiciousAgent 5.0" signature, the line card may forward HTTP request 300 to a CPU of apparatus 100. In one example, the line card may identify an offset that corresponds to and/or represents the location of the portion of HTTP request 300 that matches the "SuspiciousAgent 5.0" signature. Additionally or alternatively, the line card may identify an index that specifies and/or points to the "SuspiciousAgent 5.0" signature within storage device 102. The line card may forward the offset and/or the index to the CPU along with HTTP request 300. For example, the line card may insert and/or append the offset and the index in a footer of HTTP request 300 prior to forwarding HTTP request 300 to the CPU.

Upon receiving HTTP request 300 from the line card, the CPU may parse HTTP request 300 to determine the context of the portion of HTTP request 300 that matched the "SuspiciousAgent 5.0" signature. In one example, the CPU may obtain the offset and the index from the footer of HTTP request 300. In this example, the CPU may parse the portion of HTTP request 300 at the offset. In other words, the CPU may extract the data and/or content from the location identified by the offset. In this way, the CPU may become a more intelligent parser by dynamically deciding whether to parse or skip certain constructs in the packet rather than simply parsing the entire packet. The CPU may then compare the data and/or content parsed from that portion of HTTP request 300 against the "SuspiciousAgent 5.0" signature specified by the index.

Continuing with this example, the CPU may determine that the data pattern corresponding to the "SuspiciousAgent 5.0" signature is found in the HTTP user-agent field within the header of HTTP request 300. The location and/or positioning of that data pattern may indicate and/or suggest that HTTP request 300 is malicious. However, if that data pattern were found within the body of HTTP request 300, that location and/or positioning may not necessarily indicate and/or suggest anything malicious about HTTP request 300.

In some examples, the CPU may collaborate with the line card to reduce the number of signatures that are applicable to certain security inspections and/or packets. For example, the CPU and/or the line card may reduce the number of applicable signatures based at least in part on the application and/or business logic involved in the communication session at issue. This reduction may improve the accuracy of the security inspection results and/or mitigate false positives.

In some examples, the CPU and/or line card may perform a dynamic pattern update that facilitates determining whether to bypass certain content included in packets during the parsing phase. Instead of parsing line-by-line until reaching the end of a packet's contents, the CPU may bypass certain contents of the packet. For example, in the event that the packet represents part of a Multi-purpose Internet Mail Extension (MIME) session in which a large file is uploaded and/or downloaded, the line card may be configured and/or updated with a MIME boundary pattern such that the CPU no longer needs to parse to the end of the file for the MIME boundary. In this example, once the line card detects the MIME boundary pattern in a packet, the CPU may go directly to the offset appended to the footer for parsing and/or inspection. Additionally or alternatively, the line card may be configured and/or designed to bypass all packets unless their MIME boundary matches the corresponding boundary pattern.

These types of 2-phase security inspections may improve the accuracy of the inspection results relative to mere pattern-matching security inspections. In other words, by performing both pattern matching and parsing, these security inspections may produce less false positives than those that include only pattern matching. Moreover, by performing the pattern-matching phase prior to the parsing phase, physical processing device 106 may accelerate the security inspections relative to traditional IPS inspections and/or improve the efficiency of the same. For example, physical processing device 106 may parse only packets with patterns that match at least one of signatures 104 during the pattern-matching phase and simply forward all other non-matching packets to their respective destinations without parsing. Additionally or alternatively, physical processing device 106 may offload the pattern matching operations to hardware engines (such as a line card and/or an ASIC) to free up and/or make available additional CPU and/or GPU resources.

In some examples, the pattern matching operations may be offloaded to hardware engines because such operations involve and/or require nothing more than a fixed algorithm, and hardware like line cards and ASICs may be able to perform the fixed algorithm at the ingress port at speeds comparable to the packet I/O rate and/or line rate. In this way, physical processing device 106 may accelerate the security inspections performed on packets arriving at apparatus 100 using inline pattern matching and subsequent selective and/or intelligent parsing.

In some examples, physical processing device 106 may perform a security action in connection with the packet upon determining that the packet is malicious. Examples of such a security action include, without limitation, dropping the packet, terminating a communication session in which the packet originated, blacklisting the device that sent the packet, combinations or variations of one or more of the same, and/or any other suitable security action.

Figure 5:
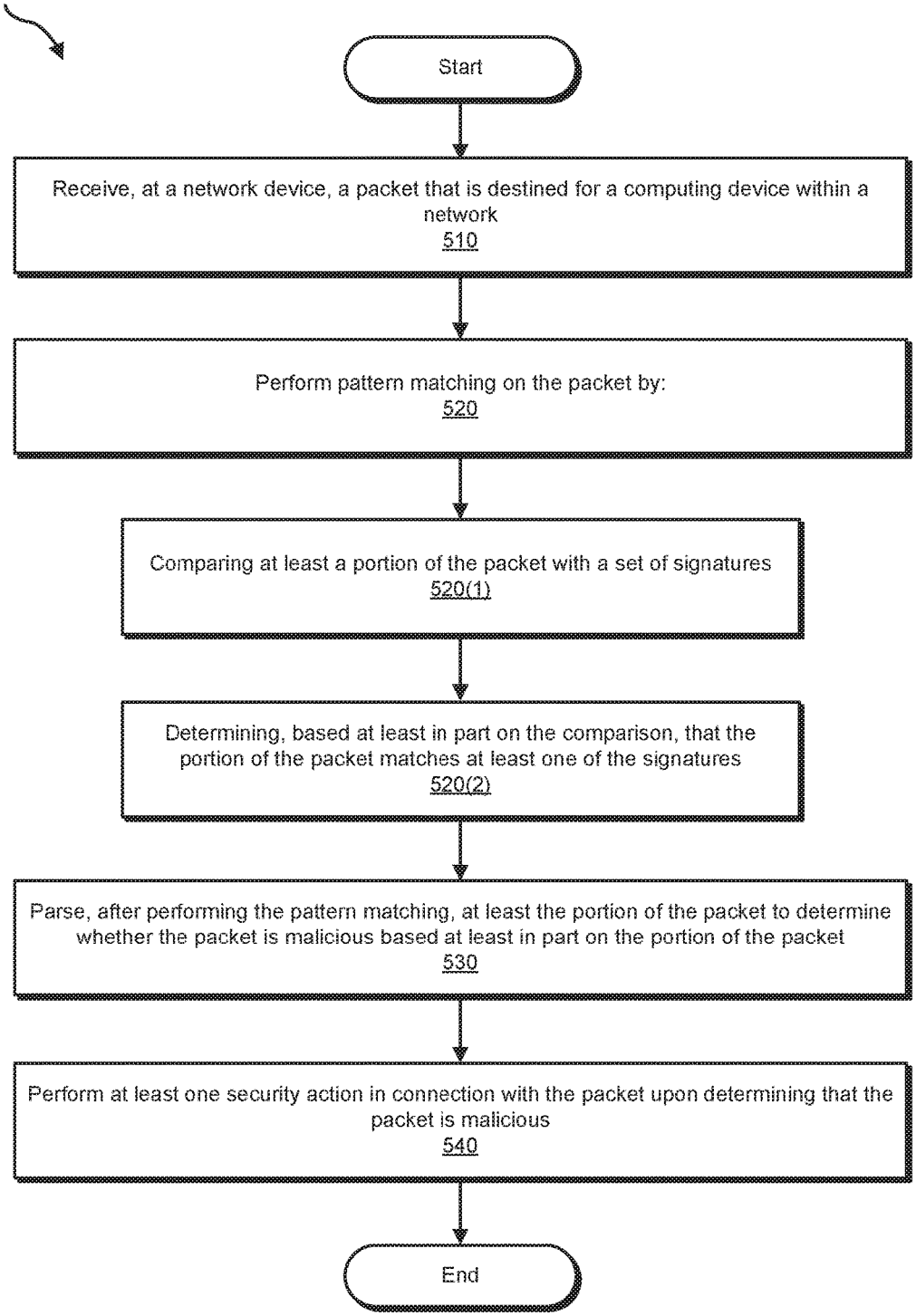
FIG. 5 is a flow diagram of an exemplary method for accelerating security inspections using inline pattern matching.

FIG. 5 is a flow diagram of an exemplary method 500 for accelerating security inspections using inline pattern matching. Method 500 may include the step of receiving a packet that is destined for a computing device within a network (510). This receiving step may be performed in a variety of ways. In one example, a network device within a network may detect and/or receive a packet from a computing device within the network. In another example, the network device may detect and/or receive a packet from a computing device outside of the network.

In some examples, method 500 may also include the step of performing pattern matching on the packet (520). This step may be performed in a variety of ways. In one example, the network device may compare at least a portion of the packet with a set of signatures that facilitate pattern matching (520(1)). The network device may then determine that the portion of the packet matches at least one of the signatures based at least in part on the comparison (520(2)).

In some examples, method 500 may further include the step of parsing, after performing the pattern matching, at least the portion of the packet to determine whether the packet is malicious based at least in part on the portion of the packet (530). This parsing step may be performed in a variety of ways. In one example, the network device may extract data and/or information included in certain fields of the packet. In this example, the network device may create and/or develop a context for a pattern match detected within the packet based at least in part on the extracted data and/or information.

Additionally or alternatively, method 500 may include the step of performing at least one security action in connection with the packet upon determining that the packet is malicious (540). This step may be performed in a variety of ways. In one example, the network device may drop the packet and/or terminate a communication session in which the packet originated. In another example, the network device may blacklist the computing device that sent the packet.

Figure 6:
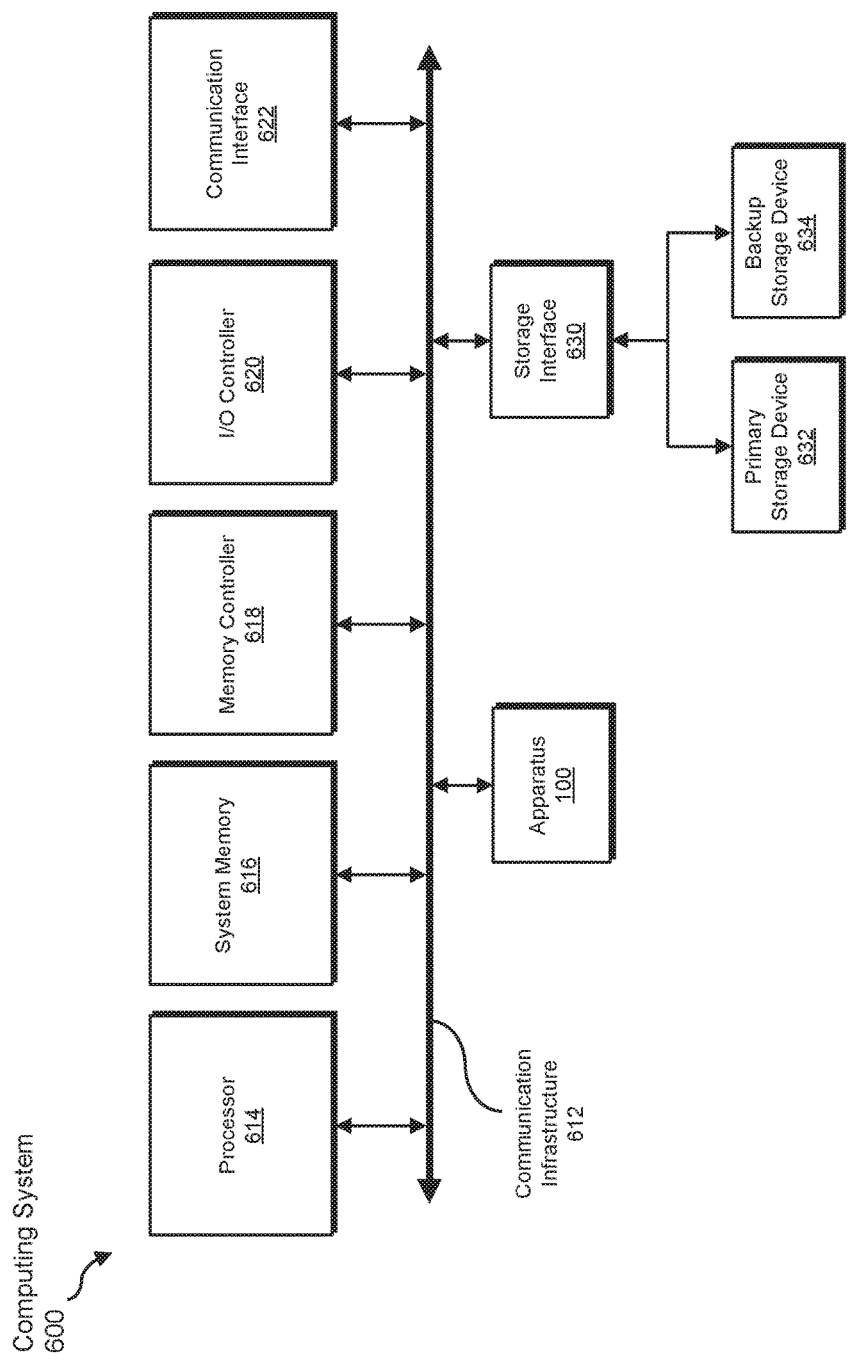
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform and/or be a means for performing and/or implementing any other steps, methods, or processes described and/or illustrated herein. In one example, computing system 600 may include apparatus 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone outers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   at least one storage device that stores a set of signatures that facilitate pattern matching in connection with network traffic on a network device; and
   at least one physical processing device communicatively coupled to the storage device;
   at least one hardware accelerator communicatively coupled to the physical processing device, wherein the hardware accelerator:
      receives a packet that is destined for a computing device within a network, wherein the packet is unparsed upon receipt by the hardware accelerator;
      performs pattern matching on the packet by:
         comparing at least a portion of the packet with the set of signatures stored in the storage device; and determining, based at least in part on the comparison, that the portion of the packet matches at least one of the signatures;
identifies an offset that corresponds to a location of the portion of the packet that matches the signature;
identifies an index that specifies, relative to the storage device, the signature to which the portion of the packet matches;
inserts the offset and the index in a footer of the packet prior to forwarding the packet to the physical processing device;
forwards the packet with the offset and the index inserted in the footer to the physical processing device;
wherein the physical processing device:
receives the packet from the hardware accelerator after completion of the pattern matching by the hardware accelerator;
obtains the offset and the index from the footer of the packet;
parses at least the portion of the packet to determine whether the packet is malicious based at least in part on the offset and the index of the portion of the packet; and
performs, upon determining that the packet is malicious, at least one security action in connection with the packet.

2. The apparatus of claim 1, wherein the physical processing device comprises at least one of:
a Central Processing Unit (CPU); and
a Graphics Processing Unit (GPU).

3. The apparatus of claim 1, wherein the hardware accelerator comprises at least one of:
a line card; and
an Application Specific Integrated Circuit (ASIC).

4. The apparatus of claim 1, wherein:
the physical processing device:
parses the portion of the packet at the offset; and
compares content parsed from the portion of the packet at the offset with the at least one of the signatures specified by the index.

5. The apparatus of claim 1, wherein the portion of the packet comprises at least one of:
a payload of the packet; and
a header of the packet.

6. The apparatus of claim 1, wherein:
the hardware accelerator:
receives another packet that is destined for a computing device within the network;
performs pattern matching on the other packet by:
comparing the other packet with the set of signatures stored in the storage device; and
determining, based at least in part on the comparison, that no portion of the other packet matches any of the signatures; and
the physical processing device refuses to parse the other packet due at least in part to no portion of the packet matching any of the signatures.

7. The apparatus of claim 1, wherein the physical processing device accelerates security inspections performed on network traffic by parsing only packets with patterns that match at least one of the signatures.

8. The apparatus of claim 1, wherein the security action comprises at least one of:
dropping the packet;
terminating a communication session in which the packet originated; and
blacklisting a device that sent the packet.

9. The apparatus of claim 1, wherein the physical processing device parses the portion of the packet as part of an Intrusion Prevention System (IPS).

10. A firewall device comprising:
at least one storage device that stores a set of signatures that facilitate pattern matching in connection with network traffic on a network device; and
at least one physical processing device communicatively coupled to the storage device;
at least one hardware accelerator communicatively coupled to the physical processing device, wherein the hardware accelerator:
receives, at the firewall device, a packet that is destined for a computing device within a network, wherein the packet is unparsed upon receipt by the hardware accelerator;
performs pattern matching on the packet by:
comparing at least a portion of the packet with the set of signatures stored in the storage device; and
determining, based at least in part on the comparison, that the portion of the packet matches at least one of the signatures;
identifies an offset that corresponds to a location of the portion of the packet that matches the signature;
identifies an index that specifies, relative to the storage device, the signature to which the portion of the packet matches;
inserts the offset and the index in a footer of the packet prior to forwarding the packet to the physical processing device;
forwards the packet with the offset and the index inserted in the footer to the physical processing device;
wherein the physical processing device:
receives the packet from the hardware accelerator after completion of the pattern matching by the hardware accelerator;
obtains the offset and the index from the footer of the packet;
parses at least the portion of the packet to determine whether the packet is malicious based at least in part on the offset and the index of the portion of the packet; and
performs, upon determining that the packet is malicious, at least one security action in connection with the packet.

11. The firewall device of claim 10, wherein the physical processing device comprises at least one of:
a Central Processing Unit (CPU); and
a Graphics Processing Unit (GPU).

12. The firewall device of claim 10, wherein the hardware accelerator comprises at least one of:
a line card; and
an Application Specific Integrated Circuit (ASIC).

13. The firewall device of claim 10, wherein:
the physical processing device:
parses the portion of the packet at the offset; and
compares content parsed from the portion of the packet at the offset with the at least one of the signatures specified by the index.

14. The firewall device of claim 10, wherein the portion of the packet comprises at least one of:
- a payload of the packet; and
- a header of the packet.

15. The firewall device of claim 10, wherein:
the hardware accelerator:
- receives another packet that is destined for a computing device within the network;
- performs pattern matching on the other packet by:
  - comparing the other packet with the set of signatures stored in the storage device; and
  - determining, based at least in part on the comparison, that no portion of the other packet matches any of the signatures; and
- the physical processing device refuses to parse the other packet due at least in part to no portion of the packet matching any of the signatures.

16. The firewall device of claim 10, wherein the physical processing device accelerates security inspections performed on network traffic by parsing only packets with patterns that match at least one of the signatures.

17. The firewall device of claim 10, wherein the security action comprises at least one of:
- dropping the packet;
- terminating a communication session in which the packet originated; and
- blacklisting a device that sent the packet.

18. A method comprising:
- receiving, at a hardware accelerator on a network device, a packet that is destined for a computing device within a network, wherein the packet is unparsed upon receipt by the hardware accelerator;
- performing, by the hardware accelerator, pattern matching on the packet by:
  - comparing at least a portion of the packet with a set of signatures that facilitate pattern matching in connection with network traffic; and
  - determining, based at least in part on the comparison, that the portion of the packet matches at least one of the signatures;
- identifying, by the hardware accelerator, an offset that corresponds to a location of the portion of the packet that matches the signature;
- identifying, by the hardware accelerator, an index that specifies the signature to which the portion of the packet matches;
- inserting, by the hardware accelerator, the offset and the index in a footer of the packet prior to forwarding the packet to a physical processing device on the network device;
- forwarding, by the hardware accelerator, the packet with the offset and the index inserted in the footer to the physical processing device;
- receiving, by the physical processing device, the packet from the hardware accelerator after completion of the pattern matching by the hardware accelerator;
- obtaining, by the physical processing device, the offset and the index from the footer of the packet;
- parsing, by the physical processing device, at least the portion of the packet to determine whether the packet is malicious based at least in part on the offset and the index of the packet; and
- upon determining that the packet is malicious, performing at least one security action in connection with the packet.

* * * * *